United States Patent
Hwang et al.

(10) Patent No.: US 8,838,107 B2
(45) Date of Patent: Sep. 16, 2014

(54) ANTI-INTERFERENCE APPARATUS AND METHOD IN WIRELESS COMMUNICATION SYSTEM

(75) Inventors: Sung-Soo Hwang, Yongin-si (KR); Sang-Boh Yun, Seongnam-si (KR); Joo-Hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 12/993,546

(22) PCT Filed: May 21, 2009

(86) PCT No.: PCT/KR2009/002677
§ 371 (c)(1),
(2), (4) Date: Nov. 19, 2010

(87) PCT Pub. No.: WO2009/142445
PCT Pub. Date: Nov. 26, 2009

(65) Prior Publication Data
US 2011/0070881 A1 Mar. 24, 2011

(30) Foreign Application Priority Data
May 21, 2008 (KR) .................. 10-2008-0046996

(51) Int. Cl.
*H04W 36/00* (2009.01)
*H04W 52/02* (2009.01)
*H04W 24/10* (2009.01)
*H04W 84/04* (2009.01)
*H04W 28/04* (2009.01)

(52) U.S. Cl.
CPC ............ *H04W 24/10* (2013.01); *Y02B 60/50* (2013.01); *H04W 84/045* (2013.01); *H04W 28/04* (2013.01); *H04W 52/0206* (2013.01)
USPC ........... 455/436; 455/443; 455/444; 455/522; 455/68

(58) Field of Classification Search
CPC ... H04W 28/04; H04W 84/045; H04W 24/10; H04W 52/0206; H04W 36/30; H04W 36/04; H04W 52/24; Y02B 60/50; H04B 1/40
USPC .............. 455/423, 422.1, 436–444, 501, 522, 455/63.1, 68, 69; 370/252, 328, 331, 332, 370/333
See application file for complete search history.

(56) References Cited

U.S. PATENT DOCUMENTS

| | | | |
|---|---|---|---|
| 2003/0027587 A1* | 2/2003 | Proctor, Jr. | 455/522 |
| 2005/0078634 A1* | 4/2005 | Seo | 370/331 |
| 2005/0156709 A1* | 7/2005 | Gilbert et al. | 340/10.1 |
| 2005/0221824 A1* | 10/2005 | Lee et al. | 455/435.2 |
| 2007/0097939 A1* | 5/2007 | Nylander et al. | 370/338 |
| 2007/0183427 A1 | 8/2007 | Nylander et al. | |

* cited by examiner

*Primary Examiner* — Ajit Patel
(74) *Attorney, Agent, or Firm* — Jefferson IP Law, LLP

(57) ABSTRACT

The present invention relates to an apparatus and method for reducing the interference caused by a femtocell in a wireless communication system. The method comprises the steps of: measuring the intensity of a signal received from a terminal when the transmission mode is deactivated; and controlling the transmission mode to be activated according to the signal intensity, and thus has the advantage of decreasing the influence effects caused by the femtocell and reducing the power consumption in a femto base station.

18 Claims, 9 Drawing Sheets

ANTI-INTERFERENCE APPARATUS AND METHOD IN WIRELESS COMMUNICATION SYSTEM

BACKGROUND OF THE INVENTION

The present invention relates to a wireless communication system providing a femtocell. More particularly, the present invention relates to an apparatus and method for reducing the interference caused by the femtocell in the wireless communication system.

In a cellular wireless communication system, a phenomenon in which communication between a terminal and a base station is not smoothly performed occurs, because a channel state is deteriorated due to a geographical requirement within a cell, a distance between the terminal and the base station, or the movement of the terminal. For example, even within a service area of the base station, a propagation shadow area can be formed by a sealed building such as an office or a house. If the terminal is located in the propagation shadow area, the base station fails to perform smooth communication because the channel state with the terminal is deteriorated.

Accordingly, the wireless communication system provides a femtocell service for solving a service problem of the propagation shadow area while providing a high speed data service. Here, the femtocell means a small cell area formed by a femto base station accessing a mobile communication core network through a broadband network installed in doors such as an office, a house, etc.

As described above, the wireless communication system can install a femto base station in the propagation shadow area and increase a capacity of the whole macro cell. However, a terminal accessing a macro base station and performing communication suffers a problem that communication quality is degraded by interference from a femtocell.

SUMMARY OF THE INVENTION

An aspect of the present invention is to substantially solve at least the above problems and/or disadvantages and to provide at least the advantages below. Accordingly, one aspect of the present invention is to provide an apparatus and method for reducing the interference caused by a femtocell in a wireless communication system.

Another aspect of the present invention is to provide an apparatus and method for, when an accessing terminal no longer exists, deactivating a transmission mode in a femto base station of a wireless communication system.

A further aspect of the present invention is to provide an apparatus and method for controlling a transmission mode of a femto base station to be activated according to an uplink signal intensity of a terminal in a wireless communication system.

The above aspects are achieved by providing an anti-interference apparatus and method in a wireless communication system.

According to one aspect of the present invention, a method for controlling a transmit mode in a femto base station of a wireless communication system is provided. The method includes the steps of: measuring the intensity of a signal received from a terminal when the transmission mode is deactivated, and controlling the transmission mode to be activated considering the signal intensity.

According to another aspect of the present invention, an apparatus for controlling a transmission mode in a femto base station of a wireless communication system is provided. The apparatus includes a receiving unit for receiving a signal, a signal intensity measurement unit for measuring the intensity of a signal received through the receiving unit, and a transmission mode controller for, when the transmission mode is deactivated, controlling the transmission mode to be activated considering the signal intensity measured in the signal intensity measurement unit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The following description is made for a technology for reducing the interference caused by a femtocell in a wireless communication system.

Figure 1:
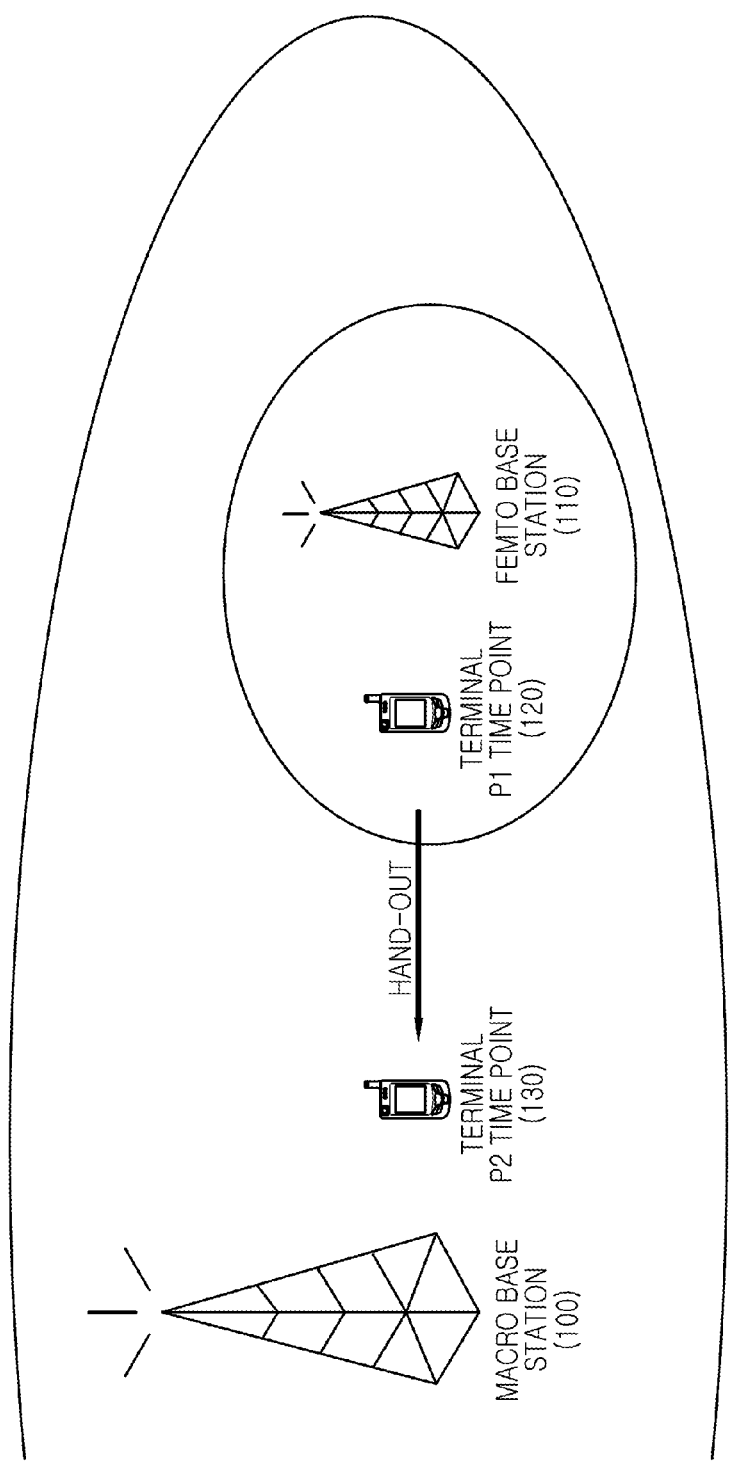
FIG. 1 is a diagram illustrating a construction of a wireless communication system including a femtocell according to an exemplary embodiment of the present invention.

The wireless communication system providing a femto service is constructed as illustrated in FIG. 1 below.

FIG. 1 illustrates a construction of a wireless communication system including a femtocell according to an exemplary embodiment of the present invention.

As illustrated in FIG. 1, a macro base station 100 manages one macro cell, and a femtocell managed by a femto base station 110 is located within the macro cell.

In case that a terminal is located within the femtocell at a P1 time point 120, the terminal accesses the femto base station 110 and performs communication.

If the terminal moves outside the femtocell at a P2 time point 130, the terminal accesses the macro base station 100 through handover and performs communication.

At this time, when the terminal hands over to the macro base station and thus a terminal accessing the femto base station 110 no longer exists, the femto base station 110 controls a transmission mode to be deactivated so as to reduce the interference effects exerted on the macro cell. For example, the femto base station 110 converts a transmit power into an OFF state. For another example, the femto base station 110 controls to minimize the transmit power. In the following description, it is assumed that, when the transmission mode of the femto base station is deactivated, the femto base station converts a transmit power into an OFF state.

As described above, a femto base station deactivates a transmit mode when a terminal accessing itself no longer exists. In this case, the transmit power of the femto base station is changed as illustrated in FIG. 2 below.

Figure 2:
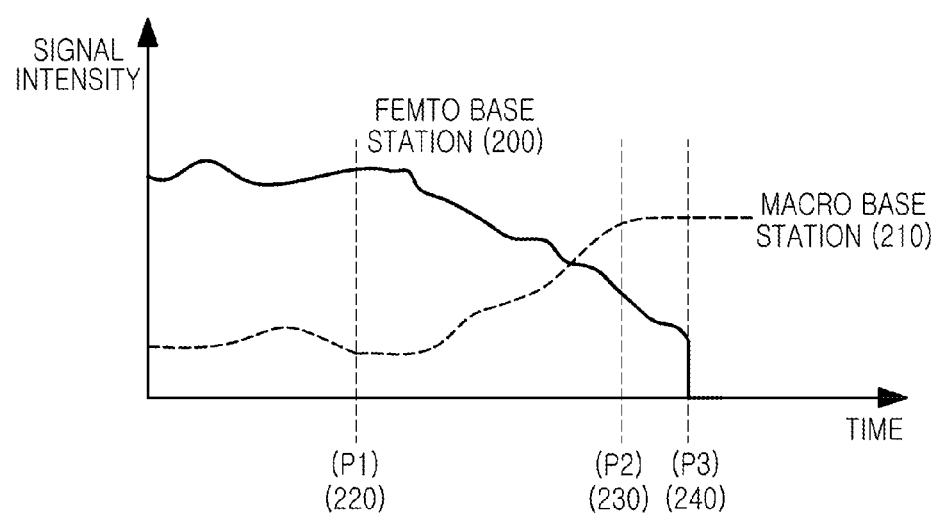
FIG. 2 is a diagram illustrating a received signal intensity that a terminal experiences in a wireless communication system according to an exemplary embodiment of the present invention.

FIG. 2 illustrates a received signal intensity that a terminal experiences in a wireless communication system according to an exemplary embodiment of the present invention.

As illustrated in FIG. 2, in case that a terminal is located within a femtocell at a P1 time point 220, the terminal detects a signal intensity 200 of a femto base station greater than a signal intensity 210 of a macro base station. Thus, the terminal accesses the femto base station at the P1 time point 220 and performs communication.

If the terminal moves outside the femtocell, the signal intensity 210 of the macro base station detected by the terminal gradually increases more than the P1 time point 220. Contrary to this, the signal intensity 200 of the femto base station detected by the terminal gradually decreases less than the P1 time point 220.

Accordingly, if the terminal moves outside the femtocell at a P2 time point 230, the terminal detects the signal intensity 210 of the macro base station greater than the signal intensity 200 of the femto base station. Thus, the terminal performs handover to the macro base station.

If the femto base station is provided with a handover procedure completion signal from the terminal or macro base station at a P3 time point 240 in a process of performing a handover procedure of the terminal, the femto base station converts a transmit power into an OFF state. Here, the femto base station converts the transmit power into the OFF state only when a terminal providing a service no longer exists besides the terminal having handed over to the macro base station at the P3 time point 240.

Figure 3:
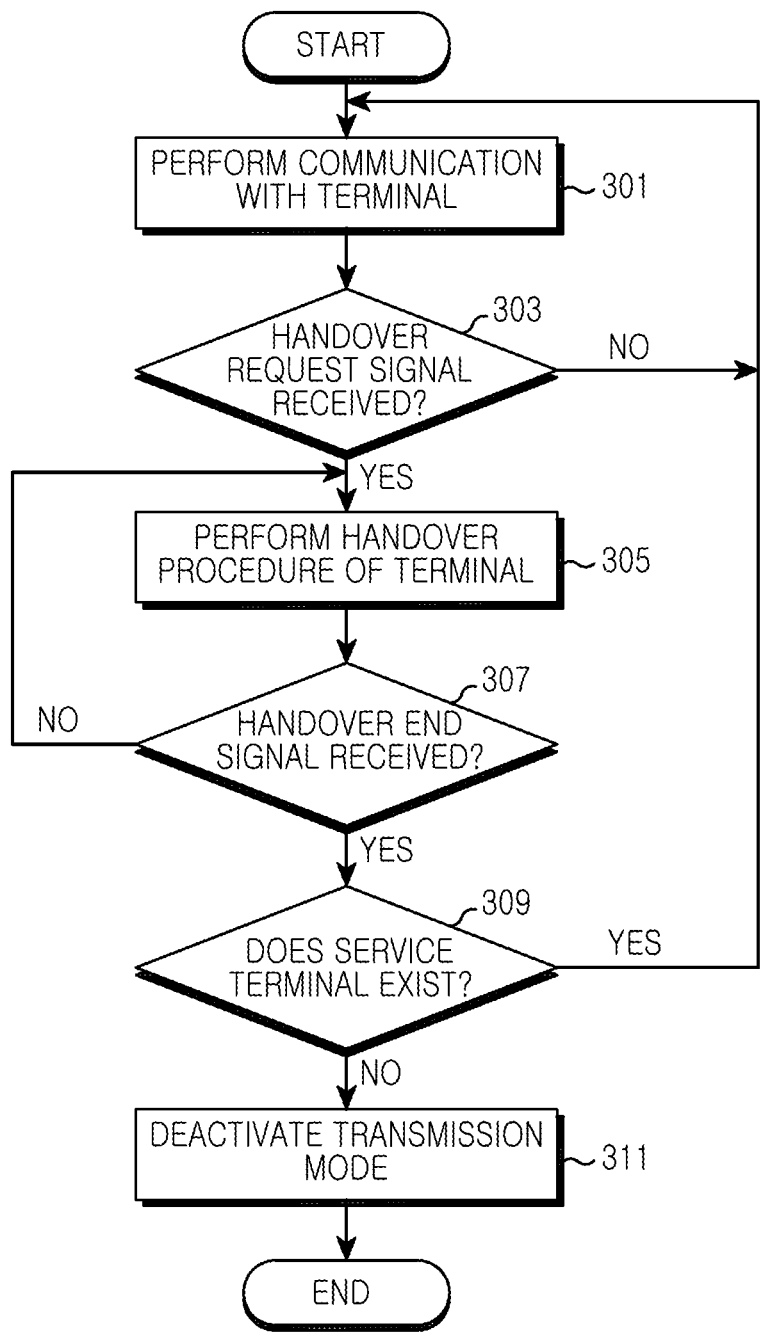
FIG. 3 is a diagram illustrating a procedure for controlling a transmission mode to be deactivated in a femto base station of a wireless communication system according to an exemplary embodiment of the present invention.

As described above, a femto base station controls a transmit power as illustrated in FIG. 3 below depending on the existence or non-existence of a terminal accessing itself.

FIG. 3 illustrates a procedure for controlling a transmission mode to be deactivated in a femto base station of a wireless communication system according to an exemplary embodiment of the present invention.

Referring to FIG. 3, first, in step 301, the femto base station performs communication with at least one terminal accessing itself.

After that, the femto base station proceeds to step 303 and identifies if a handover request signal is received from a terminal accessing itself. That is, the femto base station identifies if a signal requesting that the terminal accessing itself hands over to a macro base station or adjacent different femto base station is received.

If the handover request signal is received, the femto base station proceeds to step 305 and performs a handover procedure for the terminal such that the terminal transmitting the handover request signal accesses the macro base station or adjacent different femto base station.

After that, the femto base station proceeds to step 307 and identifies if a handover completion signal for the terminal is received. For example, the femto base station identifies if the handover completion signal is received from the terminal. For another example, the femto base station can identify if the handover completion signal is received from the macro base station to which the terminal hands over. For further example, the femto base station can identify if the handover completion signal is received from the adjacent different femto base station to which the terminal hands over.

If the handover completion signal is received, the femto base station proceeds to step 309 and identifies if a terminal providing a service exists. That is, the femto base station identifies if a terminal accessing itself exists.

If a terminal providing a service exists, the femto base station returns to step 301 and performs communication with at least one terminal accessing itself.

On the other hand, if a terminal providing a service no longer exists, the femto base station proceeds to step 311 and deactivates a transmission mode. That is, the femto base station converts a transmit power into an OFF state. At this time, the femto base station converts into the OFF state by lowering a level of the transmit power step by step.

After that, the femto base station terminates the algorithm of the present invention.

In the aforementioned exemplary embodiment, a femto base station converts a transmit power into an OFF state, when a terminal hands over to a macro base station or a different femto base station and thus a terminal accessing itself no longer exists. Here, that the terminal accessing the femto base station no longer exists means that a terminal performing voice call and data communication through the femto base station no longer exists. That is, although a plurality of terminals being in an idle mode exist within a cell of the femto base station, the femto base station judges that an accessing terminal no longer exists, and deactivates the transmission mode. Here, the terminal being in the idle mode means a terminal not performing voice call and data communication.

In another exemplary embodiment, when a terminal having provided a service drops a call and thus an accessing terminal no longer exists, a femto base station deactivates a transmission mode. For example, in case that a terminal is located within a femtocell at a P1 time point 120 as illustrated in FIG. 1 above, the femto base station 110 maintains the transmission mode in an activation state and provides a service to the terminal. If the terminal drops a call and thus a terminal accessing the femto base station 110 no longer exists, the femto base station 110 deactivates the transmission mode as illustrated in FIG. 4 below.

Figure 4:
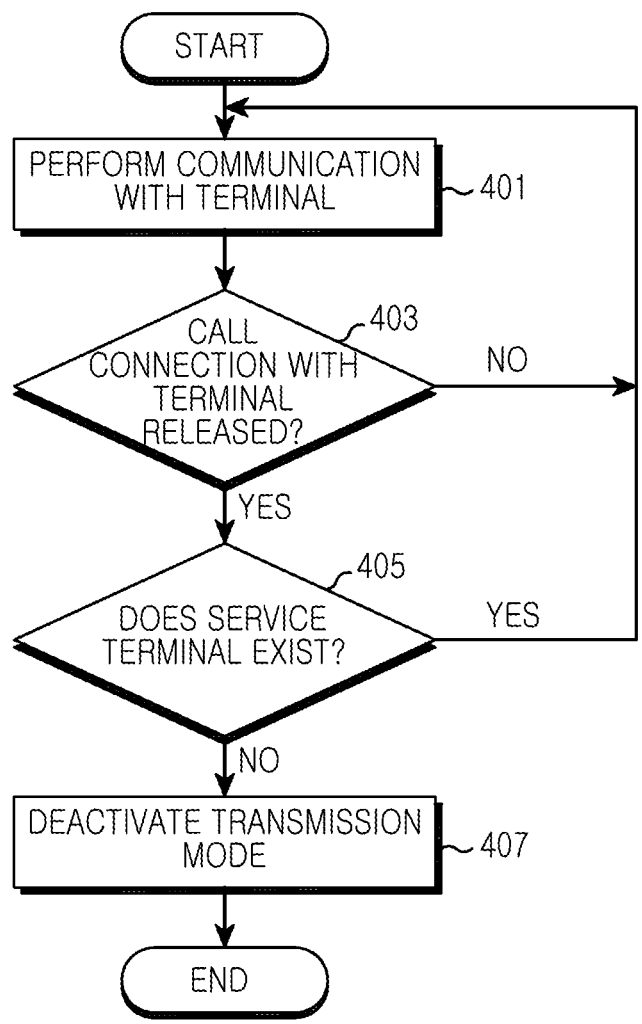
FIG. 4 is a diagram illustrating a procedure for controlling a transmission mode to be deactivated in a femto base station of a wireless communication system according to another exemplary embodiment of the present invention.

FIG. 4 illustrates a procedure for controlling a transmission mode of a femto base station to be deactivated in a wireless communication system according to another exemplary embodiment of the present invention.

Referring to FIG. 4, first, in step 401, the femto base station performs communication with at least one terminal accessing itself.

After that, the femto base station proceeds to step 403 and identifies if a call connection with the terminal having provided a service is released. For example, the femto base station measures an uplink signal intensity of the terminal having provided the service and identifies if the call connection with the terminal is released. For another example, the femto base station identifies if a call connection release signal is received from the terminal providing the service.

If the call connection with the terminal having provided the service is released, the femto base station proceeds to step 405 and identifies if a terminal providing a service exists. That is, the femto base station identifies if a terminal accessing itself exists.

If a terminal providing a service exists, the femto base station returns to step 401 and performs communication with at least one terminal accessing itself.

On the other hand, if a terminal providing a service no longer exists, the femto base station proceeds to step 407 and deactivates a transmission mode. That is, the femto base station converts a transmit power into an OFF state. At this time, the femto base station converts into the OFF state by lowering a level of the transmit power step by step.

After that, the femto base station terminates the algorithm of the present invention.

As described above, a femto base station deactivates a transmission mode to reduce the interference effects exerted on an adjacent different femtocell or a macro cell, when a terminal accessing itself no longer exists.

Figure 5:
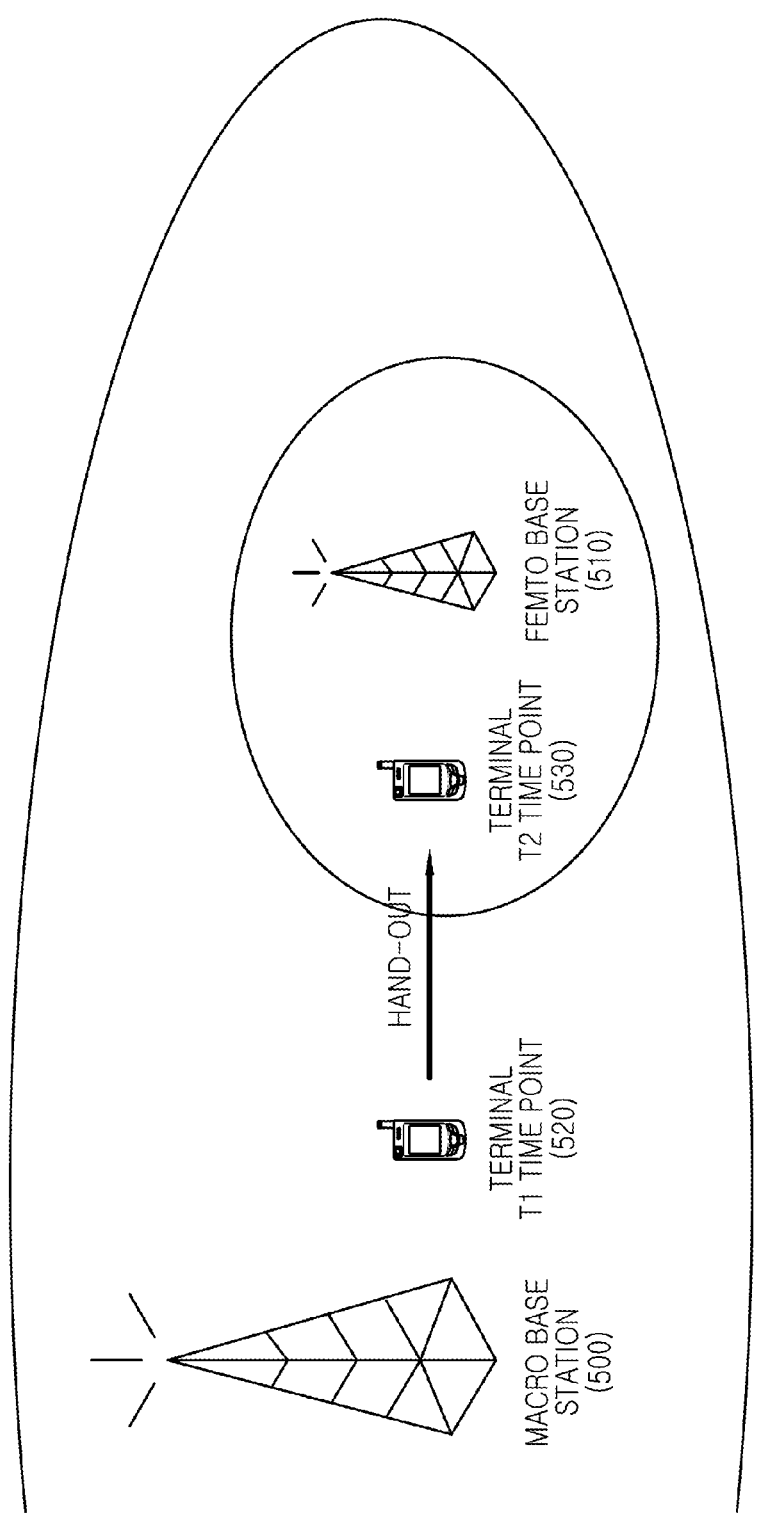
FIG. 5 is a diagram illustrating a construction of a wireless communication system including a femtocell according to another exemplary embodiment of the present invention.

In this case, the femto base station of the deactivated transmission mode can activate the transmission mode considering the intensity of an uplink signal of a terminal. For example, when a terminal hands over to a deactivated femto base station as illustrated in FIG. 5 below, the femto base station activates the transmission mode to provide a service to the terminal. That is, the femto base station converts a transmit power into an ON state.

FIG. 5 illustrates a construction of a wireless communication system including a femtocell according to another exemplary embodiment of the present invention.

As illustrated in FIG. 5, a macro base station 500 manages one macro cell, and a femtocell managed by a femto base station 510 is located within the macro cell.

In case that a terminal is located outside the femtocell at a T1 time point 520, the terminal accesses the macro base station 500 and performs communication.

If the terminal moves inside the femtocell at a T2 time point 520, the terminal hands over to the femto base station 510 and performs communication.

At this time, when a transmission mode of the femto base station 510 is in a deactivation state, the femto base station 510 activates the transmission mode according to a signal intensity of the terminal. For example, in case that the signal intensity of the terminal increases more than a reference value, the femto base station 510 converts a transmit power for providing a service to the terminal, into an ON state.

As described above, a femto base station of a deactivated transmission mode converts a transmit power into an ON state when a terminal accessing itself exists, so as to provide a service to the terminal. In this case, the transmit power of the femto base station changes as illustrated in FIG. 6 below.

FIG. 6 illustrates a received signal intensity in a wireless communication system according to another exemplary embodiment of the present invention.

Figure 6A:
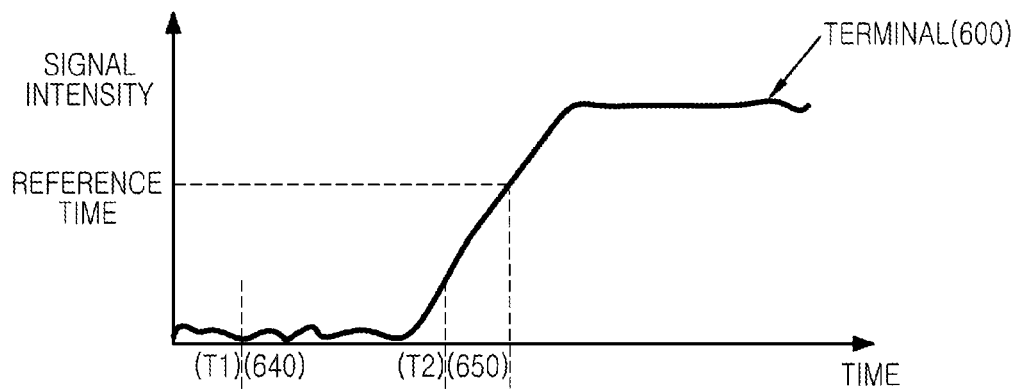
FIG. 6 is a diagram illustrating a received signal intensity in a wireless communication system according to another exemplary embodiment of the present invention.
Figure 6B:
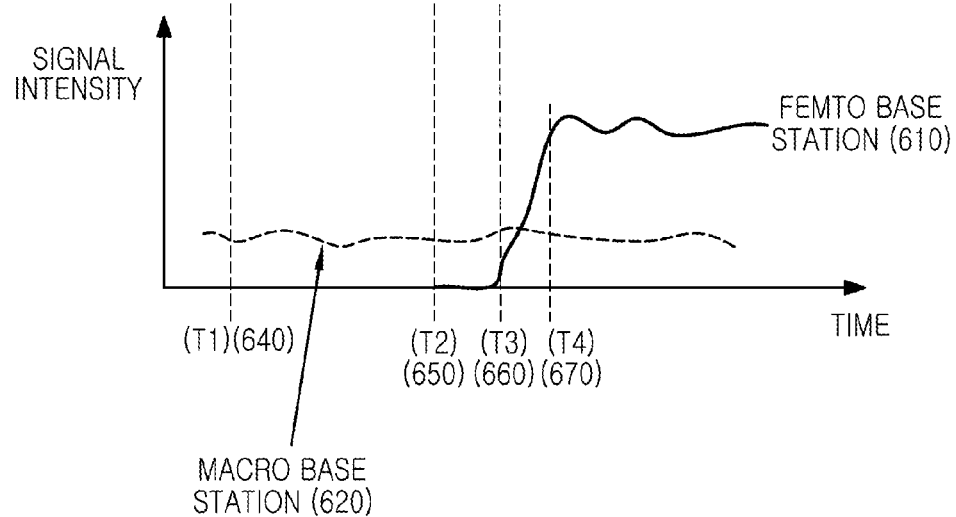

Referring to FIG. 6, FIG. 6A shows the intensity 600 of an uplink signal of a terminal detected in a femto base station, and FIG. 6B shows a signal intensity 630 of the femto base station and a signal intensity 620 of the macro base station that are detected in the terminal.

As illustrated in FIG. 6A, in case that the terminal is located outside a femtocell at a T1 time point 640, the intensity 600 of the uplink signal of the terminal detected by the femto base station is weak. Here, it is assumed that the femto base station is in a deactivation state at the T1 time point.

If the terminal moves inside the femtocell at a T2 time point 650, the signal intensity 600 of the terminal detected by the femto base station increases more than at the T1 time point 640.

Also, when the signal intensity 600 of the terminal detected by the femto base station increases more than a reference value as at a T3 time point 660, the femto base station activates a transmission mode in order to provide a service to the terminal. That is, the femto base station converts a transmit power into an ON state.

As illustrated in FIG. 6B, in case that the terminal is located outside the femtocell at the T1 time point 640, the terminal detects a signal intensity 620 of the macro base station greater than a signal intensity 630 of the femto base station. Thus, during the T1 time point 640, the terminal accesses the macro base station and performs communication.

In case that the terminal moves inside the femtocell, at the T3 time point 660, the femto base station converts the transmit power into the ON state as illustrated in FIG. 6A above. Thus, the signal intensity 630 of the femto base station detected by the terminal increases gradually.

If the signal intensity 630 of the femto base station greater than the signal intensity 620 of the macro base station detected the terminal as at a T4 time point 670, the terminal performs handover to the femto base station.

Figure 7:
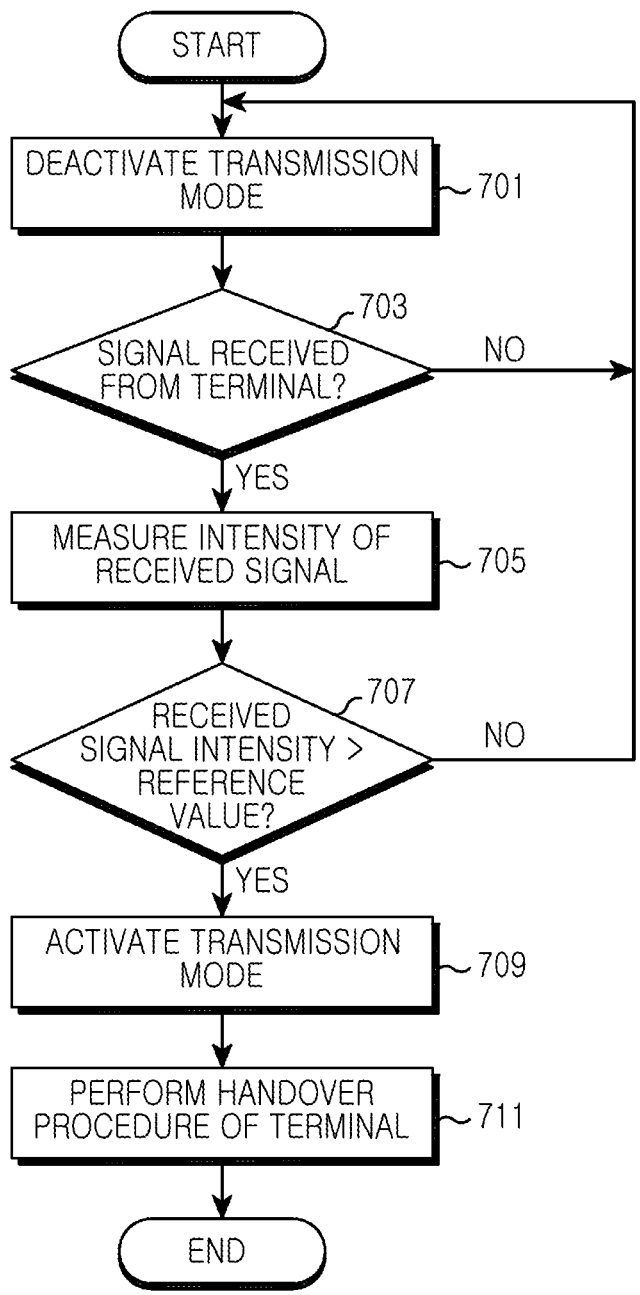
FIG. 7 is a diagram illustrating a procedure for controlling a transmission mode to be activated in a femto base station of a wireless communication system according to an exemplary embodiment of the present invention.

In case a terminal hands over from a macro base station to a femto base station as above, the femto base station controls a transmit power as illustrated in FIG. 7 below.

FIG. 7 illustrates a procedure for controlling a transmission mode of a femto base station to be activated in a wireless communication system according to an exemplary embodiment of the present invention.

Referring to FIG. 7, first, in step 701, the femto base station deactivates a transmission mode to reduce the interference effects exerted on a macro base station or an adjacent different femto base station, when a terminal accessing itself no longer exists.

When the transmission mode is in a deactivation state, the femto base station proceeds to step 703 and identifies if a signal is received from the terminal. At this time, when the transmission mode is in the deactivation state, a reception mode maintains an activation state and thus, the femto base station can receive the signal from the terminal.

If the signal is received from the terminal, the femto base station proceeds to step 705 and measures the intensity of the signal received from the terminal. Here, the signal received from the terminal includes a ranging signal transmitted by the terminal, a signal periodically transmitted, or a signal separately defined for transmission mode control of the femto base station.

After measuring the intensity of the signal, the femto base station proceeds to step 707 and compares the intensity of the signal with a reference value.

If the intensity of the signal is less than or is equal to the reference value, the femto base station proceeds to step 710 and maintains the deactivation state of the transmission mode.

On the other hand, in case that the intensity of the signal is greater than the reference value, the femto base station proceeds to step 709 and activates the transmission mode. That is, the femto base station converts a transmit power into an ON state. At this time, the femto base station converts into the ON state by increasing a level of the transmit power step by step.

When the transmission mode is activated, the femto base station proceeds to step 711 and performs a handover procedure for the terminal whose received signal intensity is greater than the reference value.

After that, the femto base station terminates the algorithm of the present invention.

In the aforementioned exemplary embodiment, in case that a terminal accessing a macro base station moves within a femtocell, a femto base station of a deactivated transmission mode activates the transmission mode according to a signal intensity of the terminal.

Figure 8:
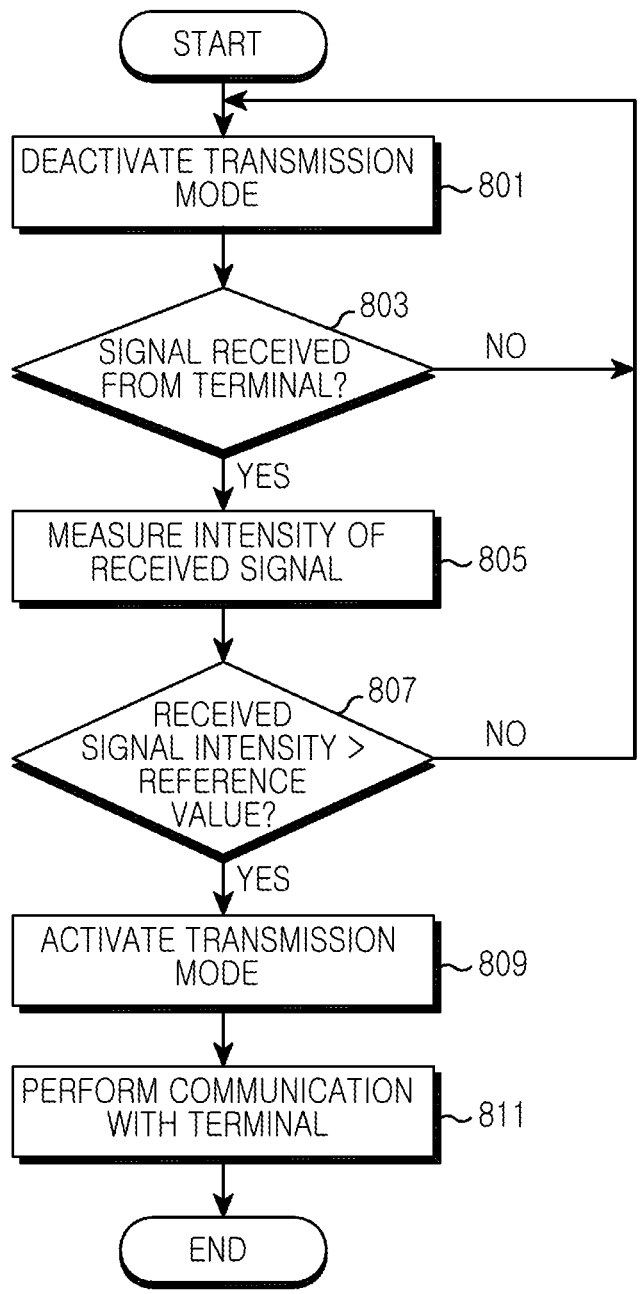
FIG. 8 is a diagram illustrating a procedure for controlling a transmission mode to be activated in a femto base station of a wireless communication system according to another exemplary embodiment of the present invention.

In another exemplary embodiment, when a terminal having been in a deactivation state or idle state within a femtocell is activated, a femto base station of a deactivated transmission mode may activate the transmission mode according to a signal intensity of the terminal as illustrated in FIG. 8 below. That is, when a terminal to perform communication through itself exists, the femto base station of the deactivated transmission mode converts a transmit power into an ON state according to a received signal intensity of the terminal.

FIG. 8 illustrates a procedure for controlling a transmission mode of a femto base station to be activated in a wireless communication system according to another exemplary embodiment of the present invention.

Referring to FIG. 8, first, in step 801, the femto base station deactivates a transmission mode to reduce the interference effects exerted on a macro base station or an adjacent different femto base station, when a terminal accessing itself no longer exists.

When the transmission mode is in a deactivation state, the femto base station proceeds to step 803 and identifies if a signal is received from the terminal. At this time, when the transmission mode is in the deactivation state, a reception mode maintains an activation state and thus, the femto base station can receive the signal from the terminal.

If the signal is received from the terminal, the femto base station proceeds to step 805 and measures the intensity of the signal received from the terminal. Here, the signal received from the terminal includes a ranging signal transmitted by the terminal, a signal periodically transmitted by the terminal, or a signal separately defined for transmission mode control of the femto base station.

After measuring the intensity of the signal, the femto base station proceeds to step 807 and compares the measured intensity of the signal with a reference value.

If the measured intensity of the signal is less than or is equal to the reference value, the femto base station proceeds to step 801 and maintains the deactivation state of the transmission mode.

On the other hand, in case that the measured intensity of the signal is greater than the reference value, the femto base station proceeds to step 809 and activates the transmission mode. That is, the femto base station converts a transmit power into an ON state. At this time, the femto base station converts into the ON state by increasing a level of the transmit power step by step.

When the transmission mode is activated, the femto base station proceeds to step 811 and performs communication with the terminal whose received signal intensity is greater than the reference value.

After that, the femto base station terminates the algorithm of the present invention.

The following description is made for a construction of a femto base station for controlling a transmission mode according to the intensity of a signal received from a terminal.

Figure 9:
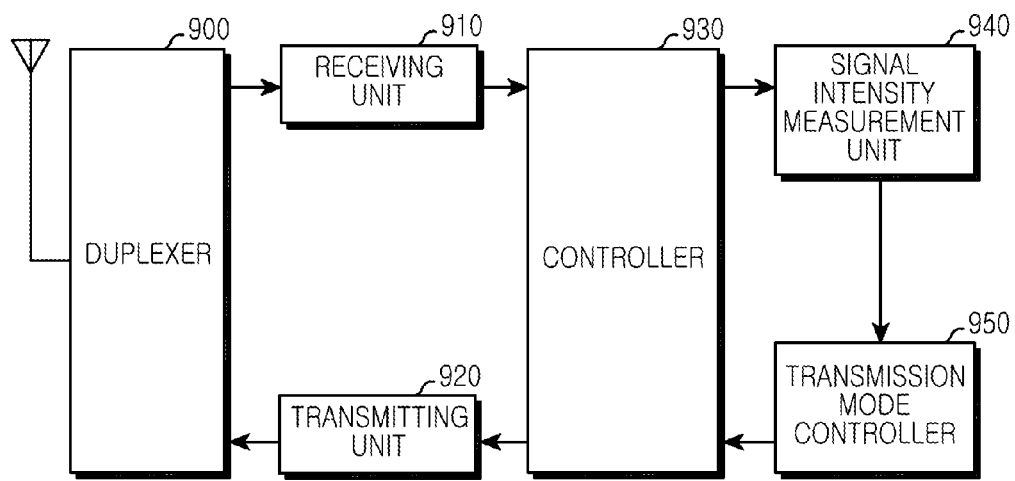
FIG. 9 is a block diagram illustrating a construction of a femto base station in a wireless communication system according to the present invention.

FIG. 9 illustrates a construction of a femto base station in a wireless communication system according to the present invention.

As illustrated in FIG. 9, a terminal includes a duplexer 900, a receiving unit 910, a transmitting unit 920, a controller 930, a signal intensity measurement unit 940, and a transmission mode controller 950.

According to a duplexing scheme, the duplexer 900 transmits a transmit signal provided from the transmitting unit 920 through an antenna, and provides a receive signal from the antenna to the receiving unit 910.

The receiving unit 910 restores data from a signal provided from the duplxer 900, and forwards to the controller 930. For example, the receiving unit 910 includes an RF reception block, a demodulation block, a channel decoding block, etc. The RF reception block is composed of a filter, an RF pre-processor, etc. In case that using an orthogonal frequency division multiplexing scheme, the demodulation block is composed of an FFT operator for extracting data loaded in each subcarrier, etc. The channel decoding block is composed of a demodulator, a deinterleaver, a channel decoder, etc.

The controller 930 controls the general transmission/reception operation of the femto base station. Also, the controller 930 controls a transmit mode according to the control of the transmission mode controller 950 so as to reduce the interference effects exerted on a macro cell or an adjacent different femtocell. That is, the controller 930 turns ON/OFF a transmit power according to the control of the transmission mode controller 950. For example, when the transmit power is in an OFF state, the controller 930 converts into an ON state by increasing the transmit power step by step according to the control of the transmission mode controller 950. On the other hand, when the transmit power is in the ON state, the controller 930 converts into the OFF state by decreasing the transmit power step by step according to the control of the transmission mode controller 950.

The signal intensity measurement unit 940 measures the intensity of an uplink signal of a terminal provided through the controller 930 and provides to the transmission mode controller 950. At this time, the signal intensity measurement unit 940 measures the signal intensity of the terminal using a ranging signal transmitted by the terminal, a signal periodically transmitted by the terminal, or a signal separately defined for transmission mode control of the femto base station and transmitted by the terminal.

When a transmission mode is in an activation state, the transmission mode controller 950 controls the controller 930 to deactivate the transmission mode when a terminal accessing the femto base station no longer exists. For example, when the terminal accessing the femto base station no longer exists through handover or call connection release with the terminal, the transmission mode controller 950 controls the controller 930 to deactivate the transmission mode. At this time, the transmission mode controller 950 can identify the call connection release of the terminal according to a call release signal received from the terminal or a signal intensity received from the terminal in the signal intensity measurement unit 940.

When the transmission mode is in a deactivation state, the transmission mode controller 950 controls the controller 930 to activate the transmission mode according to the intensity of a signal provided from a terminal provided from the signal intensity measurement unit 940. For example, the transmission mode controller 950 controls the controller 930 to activate the transmission mode when a signal intensity provided from the signal intensity measurement unit 940 is greater than a reference value.

The transmitting unit 920 converts a transmit signal into a form for transmission through wireless resources according to the control of the controller 930 and provides to the duplexer 900. For example, the transmitting unit 920 includes a channel encoding block, a modulation block, an RF transmission block, and the like. The channel encoding block is composed of a modulator, an interleaver, a channel encoder, and the like. In case that using an orthogonal frequency division multiplexing scheme, the modulation block is composed of an IFFT operator for mapping data to each subcarrier, and the like. The RF transmission block is composed of a filter, an RF preprocessor, and the like.

In the aforementioned construction, the controller 930 is a protocol controller, and controls the signal intensity measurement unit 940 and the transmission mode controller 950. That is, the controller 930 can perform functions of the signal intensity measurement unit 940 and the transmission mode controller 950. These are separately constructed and shown in order to distinguish and describe respective functions in the present invention. Thus, in an actual realization, construction can be such that all of them are processed in the controller 930, or construction can be such that only part of them is processed in the controller 930.

As described above, there is an advantage that a femto base station controls a transmit mode according to an uplink signal intensity of a terminal, thereby being capable of decreasing the interference effects caused by a femtocell and reducing the power consumption of the femto base station in a wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling a transmission mode in a femto base station of a wireless communication system, the method comprising:
   when the transmission mode of the femto base station is deactivated, measuring a signal strength of a signal received from a terminal;
   determining whether to activate the transmission mode of the femto base station according to the signal strength of the signal received from the terminal; and
   controlling to activate the transmission mode or to maintain deactivation state of the transmission mode of the femto base station according to the determination result.

2. The method of claim 1, wherein the controlling of the transmission mode of the femto base station to be activated comprises:
   comparing the measured signal strength with a reference value; and
   if the signal strength is greater than the reference value, controlling the transmission mode of the femto base station to be activated.

3. The method of claim 2, wherein the controlling of the transmission mode of the femto base station to be activated comprises increasing a transmit power gradually and converting the transmit power of the femto base station into an ON state.

4. The method of claim 2, further comprising:
   if the signal strength is less than or is equal to the reference value, maintaining the deactivation state of the transmission mode of the femto base station.

5. The method of claim 1, further comprising:
   if a handover completion signal for a terminal having provided a service is received in a state in which the transmission mode of the femto base station is activated, determining whether a terminal providing a service exists; and
   if a terminal providing a service no longer exists, controlling the transmission mode of the femto base station to be deactivated.

6. The method of claim 1, further comprising:
   if a call connection with a terminal providing a service is released in a state in which the transmission mode of the femto base station is activated, determining whether a terminal providing a service exists; and
   if a terminal providing a service no longer exists, controlling the transmission mode of the femto base station to be deactivated.

7. The method of claim 5, wherein the controlling of the transmission mode of the femto base station to be deactivated comprises decreasing a transmit power of the femto base station gradually and converting the transmit power of the femto base station into an OFF state.

8. An apparatus for controlling a transmission mode in a femto base station of a wireless communication system, the apparatus comprising:
   a receiving unit for receiving a signal;
   a signal strength measurement unit for measuring a signal strength of a signal received through the receiving unit; and
   a transmission mode controller for, when the transmission mode of the femto base station is deactivated, determining whether to activate the transmission mode of the femto base station according to the signal strength of the signal received from the terminal, and for controlling to activate the transmission mode or to maintain deactivation state of the transmission mode of the femto base station according to the determination result.

9. The apparatus of claim 8, wherein, when the transmission mode of the femto base station is deactivated, in case that the signal strength is greater than a reference value, the transmission mode controller controls the transmission mode of the femto base station to be activated and, when the transmission mode of the femto base station is deactivated, in case that the signal strength is less than or is equal to the reference value, the transmission mode controller controls to maintain the deactivation state of the transmission mode of the femto base station.

10. The apparatus of claim 9, wherein, when controlling the transmission mode of the femto base station to be activated, the transmission mode controller increases a transmit power of the femto base station gradually and converts the transmit power into an ON state.

11. The apparatus of claim 8, further comprising a transmitting unit activated or deactivated according to the control of the transmission mode controller.

12. The apparatus of claim 8, wherein, in a state in which the transmission mode of the femto base station is activated, when a terminal providing a service no longer exists, the transmission mode controller controls the transmission mode of the femto base station to be deactivated.

13. The apparatus of claim 12, wherein, when controlling the transmission mode of the femto base station to be deactivated, the transmission mode controller decreases a transmit power gradually and converts the transmit power of the femto base station into an OFF state.

14. The apparatus of claim 12, wherein, when a handover completion signal for a terminal having provided a service is received, the transmission mode controller determines whether a terminal providing a service exists.

15. The apparatus of claim 12, wherein, when a call connection with a terminal having provided a service is released, the transmission mode controller determines whether a terminal providing a service exists.

16. A method for controlling a transmission mode in a femto base station of a wireless communication system, the method comprising:
- When the transmission mode of the femto base station is deactivated, measuring a signal strength of a signal received from a terminal;
- determining whether the terminal is in active communication with the femto base station according to the signal strength; and
- controlling a transmission mode of the femto base station according to whether at least one terminal is in active communication with the femto base station.

17. The method of claim 16, wherein the femto base station transitions to an active transmission mode if at least one terminal is in active communication with the femto base station.

18. The method of claim 17, further comprising:
- performing a handover procedure of the terminal to the femto base station from a macro base station with which the femto base station has overlapping coverage.

* * * * *